(12) United States Patent
Fernandes et al.

(10) Patent No.: US 9,954,573 B2
(45) Date of Patent: Apr. 24, 2018

(54) REVERSIBLE MOBILE DEVICE CASE WITH INTEGRATED DISPLAY

(71) Applicant: I-BLADES, INC., Danville, CA (US)

(72) Inventors: Jorge Fernandes, Milpitas, CA (US); Val Nunes, Danville, CA (US)

(73) Assignee: I-BLADES, INC., Milpitas, CA (US)

( * ) Notice: Subject to any disclaimer, the term of this patent is extended or adjusted under 35 U.S.C. 154(b) by 0 days.

(21) Appl. No.: 15/382,177

(22) Filed: Dec. 16, 2016

(65) Prior Publication Data

US 2017/0180523 A1    Jun. 22, 2017

Related U.S. Application Data

(60) Provisional application No. 62/268,838, filed on Dec. 17, 2015.

(51) Int. Cl.
| | |
|---|---|
| *H04M 1/00* | (2006.01) |
| *H04B 1/38* | (2015.01) |
| *H04B 1/3888* | (2015.01) |
| *H04M 1/18* | (2006.01) |
| *H04M 1/725* | (2006.01) |

(52) U.S. Cl.
CPC .......... *H04B 1/3888* (2013.01); *H04M 1/185* (2013.01); *H04M 1/72527* (2013.01); *H04M 2250/12* (2013.01); *H04M 2250/16* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 6,535,199 B1 * | 3/2003 | Canova, Jr. ........... | G06F 1/1626 345/156 |
| 2013/0176237 A1 * | 7/2013 | Chu ....................... | G06F 3/1431 345/173 |
| 2015/0062037 A1 * | 3/2015 | Chang ................... | G06F 1/1626 345/173 |
| 2016/0301785 A1 * | 10/2016 | Espinoza ............... | H02J 7/025 |

FOREIGN PATENT DOCUMENTS

WO    WO 2015/075500 A1 *    5/2015    .............. H04M 1/00

* cited by examiner

*Primary Examiner* — Tuan A Tran
(74) *Attorney, Agent, or Firm* — Kilpatrick Townsend & Stockton LLP

(57) ABSTRACT

A mobile device case is described that comprises an outer shell, a blade and one or more integrated display screens. The case is reversible in that a user can place a mobile device within the case in either of a forward or backward orientation while maintaining functionality on the display screen of the mobile device and/or on the one or more integrated display screens of the case. The case protects the mobile device, and particularly its display screen, while still allowing the user to access and use the functions of the mobile device. Further, the case helps to conserve the battery life of the mobile device by deactivating some or all of the display screen of the mobile device.

20 Claims, 6 Drawing Sheets

REVERSIBLE MOBILE DEVICE CASE WITH INTEGRATED DISPLAY

CROSS-REFERENCES TO RELATED APPLICATIONS

This application claims the benefit of U.S. Provisional Patent Application No. 62/268,838, filed Dec. 17, 2015, the disclosure of which is herein incorporated by reference in its entirety.

TECHNICAL FIELD

The present disclosure relates to systems and methods for protecting and conserving the battery life of mobile electronic devices. Specifically, the present disclosure relates to a reversible mobile device case including at least one integrated display.

BACKGROUND OF THE INVENTION

Conventional mobile device cases at least partially surround mobile devices with a protective cover. The protective covers typically expose the display screen of the mobile device, or cover it with a thin layer of clear material so as to still allow a user to touch and view the display screen. However, extended use of the mobile device via the display screen uses a significant amount of the mobile device's battery life, sometimes unnecessarily.

SUMMARY OF THE INVENTION

It is desirable to protect mobile devices, and particularly their display screens, while still allowing users to access and use the functions of the mobile devices. It is further desirable to conserve the battery life of mobile devices by deactivating some or all of the display screen of the mobile device. Thus, the present disclosure relates to a reversible mobile device case that can be used for these purposes.

A reversible mobile device case is described that comprises a protective outer shell. The protective outer shell may comprise a single piece covering the front or back of the mobile device and wrapping around the sides of the mobile device so as to secure it within the outer shell. In another embodiment, the protective outer shell may comprise two pieces covering both the front and back of the mobile device and wrapping around the sides of the mobile device, securing the mobile device fully within the outer shell.

In one embodiment, the reversible mobile device case includes at least one integrated display. In one embodiment, the integrated display(s) are located on the protective outer shell. In another embodiment, the integrated display(s) are located on a blade coupled to the protective outer shell. In still another embodiment, at least one integrated display is located on the protective outer shell, and at least one integrated display is located on a blade coupled to the protective outer shell and/or the mobile device. A "blade" as used herein refers to a thin stackable component comprising a microcontroller, one or more blade coupling force elements matched to one or more coupling force elements of the mobile device (e.g., magnets of contact arrays), and a plurality of blade terminals matched to a plurality of terminals of the mobile device, as discussed further in U.S. Pat. No. 8,798,675 B2, entitled "SYSTEM OF STACKED DEVICES", which is herein incorporated by reference in its entirety. The terminals may support high speed data, power, control, and addressing, for example. The integrated display(s) can be dynamic displays, passive displays or a combination of dynamic and passive displays. Dynamic displays are touch-sensitive and able to be controlled by a user, while passive displays simply display content without requiring or responding to user touch.

Alternative to including one or more integrated displays, one or more windows can be provided to display a portion of the display screen of the mobile device. For example, one or more windows can be provided without any integrated displays. In either embodiment, the display screen of the mobile device remains fully protected. The window can comprise a thin layer of clear material that allows the user to touch and view an activated portion of the display screen of the mobile device through the layer. The image and content to be displayed through the window can be reconfigured and/or resized according to the size of the window with respect to the size of the display screen of the mobile device. In other words, only a portion of the display screen of the mobile device corresponding to the size of the window may be activated according to one embodiment.

In one embodiment, one or more of the integrated display(s) have full display functionality with respect to the display screen of the mobile device. In another embodiment, one or more of the integrated display(s) have limited display functionality with respect to the display screen of the mobile device. For example, one or more of the integrated display(s) may only be functional to display alerts regarding text messages, e-mails and/or phone calls, and may not be functional to view web pages. In another example, one or more of the integrated display(s) may be used to execute all of the functions that can be executed on the display screen of the mobile device.

The described mobile device case is reversible. For simplicity and ease of description, the mobile device will be described herein as being in a "forward" orientation in the case or in a "backward" orientation in the case. When in a "forward" orientation, the display screen of the mobile device is fully exposed and/or fully displayed to the user. When in a "backward" orientation in the case, the display screen of the mobile device is fully or partially obstructed and one or more alternative integrated display(s) are provided. Because the full display screen of the mobile device is not used in the "backward" orientation, battery life of the mobile device is conserved.

The orientation of the mobile device within the case can be determined by one or more existing or additional sensors coupled to the mobile device and/or the case. For example, the orientation of the mobile device within the case can be determined by activating the front-facing camera of the mobile device, which will sense light if in a "forward" orientation, or darkness if in a "backward" orientation. In another embodiment, magnets can be used to determine the orientation of the mobile device within the case. This information can then be transmitted to the case and/or blade to determine whether to activate one or more of the integrated display(s).

In still another embodiment, an external display screen can be coupled to the mobile device. When the mobile device is determined to be in a "backward" orientation as described above, the external display screen can be activated. The external display screen may have any or all of the functions described above with respect to the integrated display(s).

At any point in operation of the mobile device, its orientation within the case can be changed along with its corresponding functionality. For example, the mobile device can be switched at any time between the "backward" orientation with the integrated display(s) activated, to the "forward" orientation with the full display screen of the mobile device activated. When switched to a "forward" orientation from a "backward" orientation, the integrated display(s) can deactivate to conserve battery life until placed into a "backward" orientation again.

In one embodiment, a reversible mobile device case is described. The case comprises an outer shell, a blade, and one or more display screens coupled to the blade. The outer shell is configured to encompass at least a portion of a mobile device. The blade comprises a microcontroller, one or more blade coupling force elements, and one or more blade terminals. The blade coupling force elements are configured to match to one or more couple force elements of the mobile device, and the blade terminals are configured to match to one or more terminals of the mobile device.

In one embodiment, a mobile device case is described. The mobile device case comprises an outer shell configured to hold a mobile device. The mobile device includes a display screen. A first portion of the display screen is covered by the outer shell. The mobile device case further comprises a window formed in the outer shell. The window is configured to expose a second portion of the display screen of the mobile device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claims.

The foregoing, together with other features and embodiments, will become more apparently upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION OF SPECIFIC EMBODIMENTS

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Figure 1:
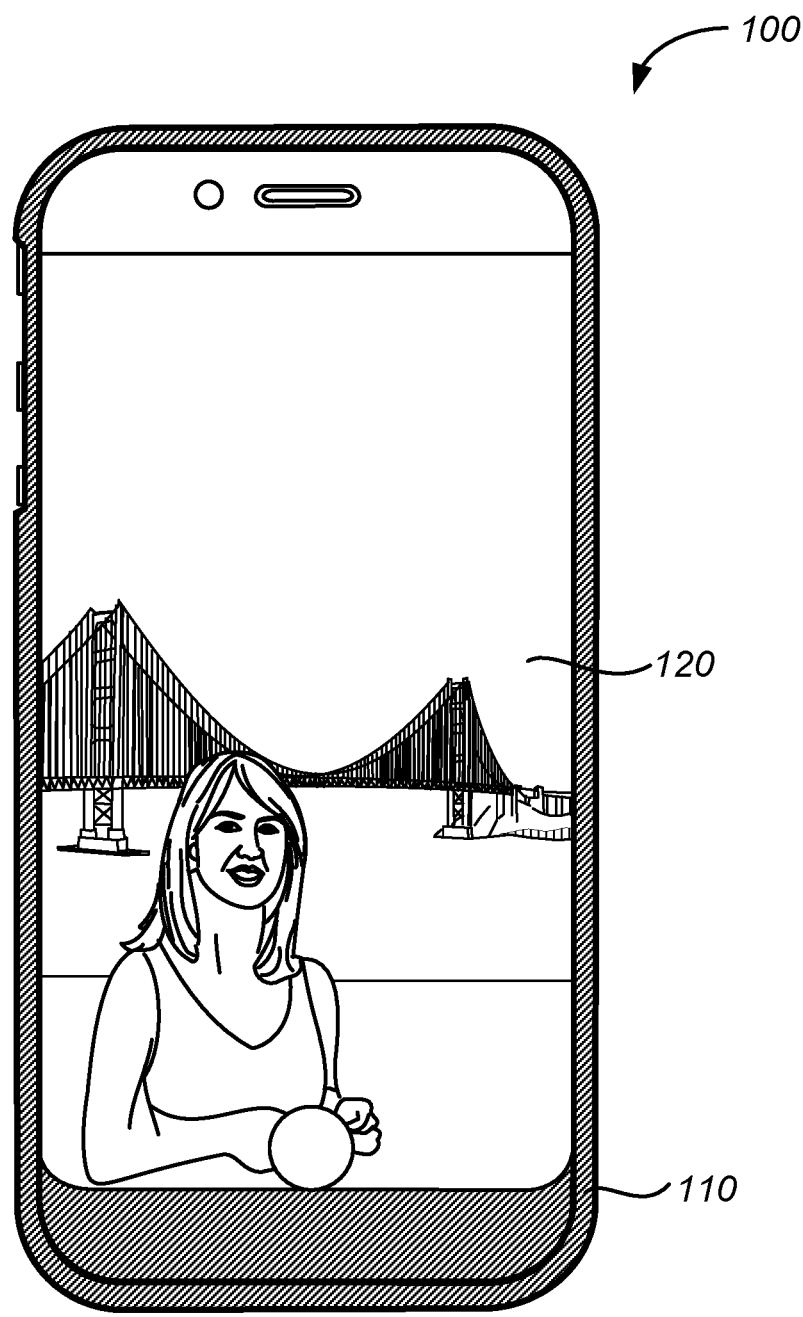
FIG. 1 is a top view of a mobile device in a "forward" orientation in a reversible case, according to some embodiments.

FIG. 1 illustrates a reversible case 100 holding a mobile device 120 in a protective outer shell 110. For simplicity and ease of description, the mobile device is described herein as being in a "forward" orientation in the case or a "backward" orientation in the case. As shown in FIG. 1, the mobile device 120 is in a "forward" orientation in the reversible case 100. Thus, the display screen of the mobile device 120 is fully exposed, fully displayed and/or fully accessible to a user.

In this embodiment, protective outer shell 110 comprises two pieces, each piece covering either the front or the back of the mobile device 120 and wrapping around the sides of the mobile device 120. The two pieces may snap together on the sides of the mobile device 120 to secure the mobile device 120 fully within the outer shell 110. In another embodiment, the protective outer shell may comprise a single piece covering the front or back of the mobile device and wrapping around the sides of the mobile device so as to secure it within the outer shell. In this embodiment, the mobile device may "snap in" to the protective outer shell. The protective outer shell 110 may be made of any suitable opaque, translucent, and/or transparent material.

In either embodiment, the protective outer shell 110 may include a thin layer of clear material covering the display screen when the mobile device 120 is in a "forward" orientation in the reversible case 100 in order to protect the screen of the mobile device 120. This layer may be of a particular material, thickness and clarity so as to still allow the user to fully interact with the display screen, despite the presence of the layer. In this embodiment, the screen of the mobile device 120 may be covered by a thin layer of transparent material, while the remainder of the protective outer shell 110 may be made of a same or different material (e.g., an opaque material). In another embodiment, the protective outer shell 110 may leave the display screen of the mobile device 120 fully exposed, without an additional layer covering the display screen. The area over the display screen (or a portion thereof) may be referred to collectively herein as a "window", including both embodiments in which a layer of material is included and in which a layer of material is not included.

The mobile device 120 may include a front-facing camera or one or more other sensors that can be used to determine the orientation of the mobile device 120 within the reversible case 100. For example, the orientation of the mobile device 120 can be determined by activating the front-facing camera of the mobile device 120, which will sense light if in a "forward" orientation, such as is shown in FIG. 1. Thus, the display screen of the mobile device 120 will remain active. Other screens employed on the reversible case 100 may remain inactive while mobile device 120 is in a "forward" orientation, as described further herein.

Figure 2A:
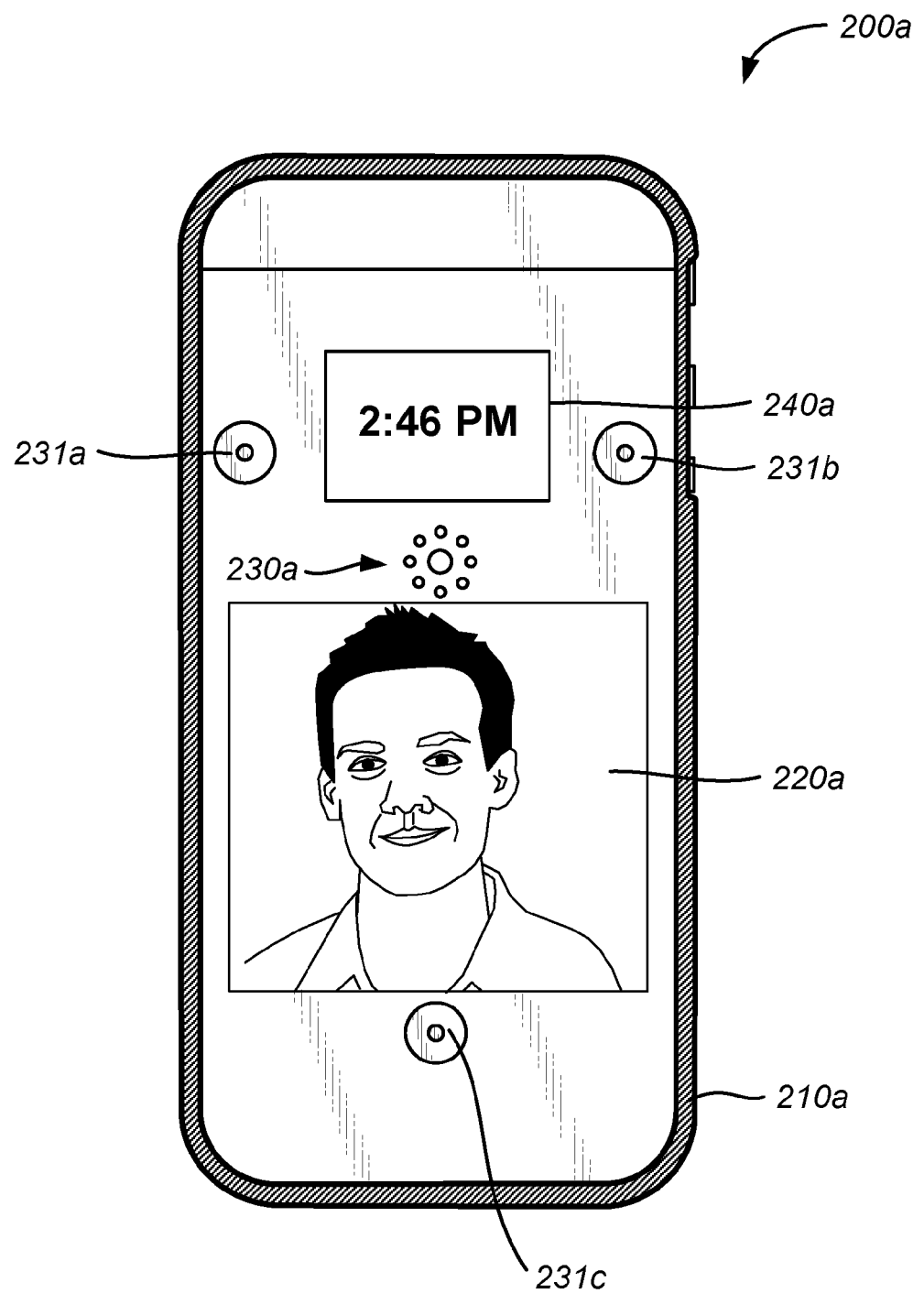
FIG. 2A is a bottom view of a reversible case having an integrated display and a display screen window, housing a mobile device in a "backward" orientation, according to some embodiments.

FIG. 2A illustrates a reversible case 200a having an integrated display 240a and a display screen window 220a, housing a mobile device in a "backward" orientation by a protective outer shell 210a. The mobile device is described as being in a "backward" orientation in the reversible case 200a because the display screen of the mobile device is partially obstructed, and an alternative or additional integrated display 240a is provided. As described above, the orientation of the mobile device as "backward" within the case can be determined by one or more existing or additional sensors coupled to the mobile device and/or the case 200a. This information can then be transmitted to the case 200a to activate the integrated display 240a, and a portion of the display screen of the mobile device shown through display screen window 220a, as described further herein.

In this embodiment, the display screen of the mobile device is only partially obstructed, such that a portion of the display screen is still displayed and accessible to a user through the display screen window 220a. When the mobile device is determined to be in a "backward" orientation, an unused, unaccessible and/or unexposed portion of the display screen can be deactivated, such that only the accessible portion of the display screen is displayed through the display screen window 220a. Items to be displayed on the display screen can thus be resized and/or reconfigured to fit and display properly on the partially obstructed display screen. In one embodiment, the display screen retains full display functionality in its partially obstructed state. Because the full display screen of the mobile device is not used in the "backward" orientation, battery life of the mobile device is conserved.

Although described herein as having only one portion of the display screen still being displayed and accessible to the user through the display screen window 220a, it is contemplated that any number of windows may be provided through which a user may access portions of the display screen. For example, a display screen may be obstructed by a "+" shape, with four windows shown visibly exposing four portions of the display screen. Each of the four portions of the display screen may display the same or different passive or dynamic content. For example, one portion of the display screen may display the time, a second portion of the display screen may display a last text message, a third portion of the display screen may display a graphic, and a fourth portion of the display screen may display a numerical touchpad.

The protective outer shell 210a may include a thin layer of clear material covering the unobstructed portion of the display screen through the display screen window 220a when the mobile device is in a "backward" orientation in the reversible case 200a in order to protect the screen of the mobile device. This layer may be of a particular material, thickness and clarity so as to still allow the user to fully interact with the unobstructed portion of the display screen (e.g., through a touch screen interface), despite the presence of the layer.

The reversible case 200a may further include an additional integrated display 240a on or in the protective outer shell 210a. The integrated display 240a may be a dynamic display or a passive display. Dynamic displays may be touch-sensitive and able to be directly controlled by a user, while passive displays may display content without requiring or responding to user touch. Integrated display 240a can have full or limited display functionality with respect to the display screen of the mobile device. For example, integrated display 240a may only be functional to display alerts regarding time, text messages, e-mails, and/or phone calls, and may not be functional to view web pages. In another example, integrated display 240a may be used to execute all of the functions that can be executed on the display screen of the mobile device.

The reversible case 200a includes a contact array 230a on a blade configured to allow communication between the elements of the reversible case 200a and the mobile device, as well as any number of additional components that may utilize similar contact arrays, including additional blades having similar or different functionalities. The blade may include a microcontroller and a contact array 230a comprising one or more coupling force elements matched to one or more coupling force elements of the mobile device (e.g., magnets), and a plurality of terminals matched to a plurality of terminals of the mobile device, as discussed further in U.S. Pat. No. 8,798,675 B2, entitled "SYSTEM OF STACKED DEVICES", which is herein incorporated by reference in its entirety. The terminals may support high speed data, power, control, and addressing, for example.

In one embodiment, the reversible case 200a may further include connectors 231a, 231b, and 231c. Connectors 231a-c may be mechanical male or female connectors, such as snaps, configured to mate to a corresponding male or female connector in corresponding locations on another device (e.g., a blade, a mobile device, a case, etc.). Connectors 231a-c may further or alternatively include magnets to ensure a sturdy connection to another device.

Although shown as circular in shape and positioned in a triangular configuration, it is contemplated that connectors 231a-c may be of any size, shape, or be placed in any configuration on the reversible case 200a.

In one embodiment, reversible case 200a can further integrate vibration capability. In this embodiment, certain alerts may be made via vibration of case 200a, such as phone calls, text messages and alarms. This may be alternative to vibration of the mobile device itself, further conserving battery life of the mobile device. In some embodiments, however, vibration of case 200a may be additional to vibration of the mobile device to provide more intense haptic feedback.

Figure 2B:
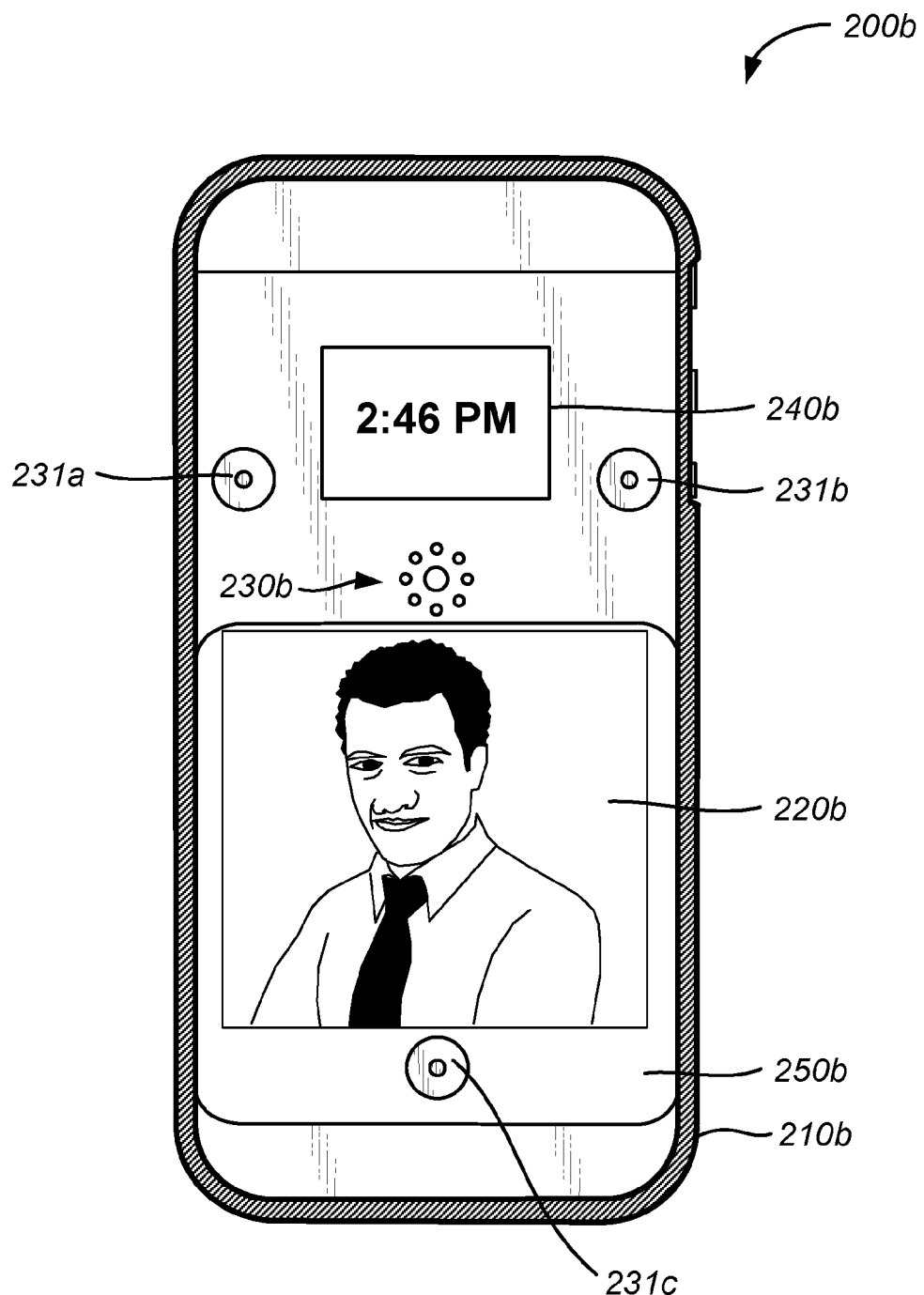
FIG. 2B is a bottom view of a reversible case having two integrated displays, housing a mobile device in a "backward" orientation, according to some embodiments.

FIG. 2B illustrates a reversible case 200b according to another embodiment. Reversible case 200b has two integrated displays: integrated display 240b and integrated display 220b. Reversible case 200b is housing a mobile device in a "backward" orientation in a protective outer shell 210b. The mobile device is described as being in a "backward" orientation in the reversible case 200b because the display screen of the mobile device is fully obstructed, and two alternative integrated displays 220b, 240b are provided. As described above, the orientation of the mobile device as "backward" within the case can be determined by one or more existing or additional sensors coupled to the mobile device and/or the case 200b. This information can then be transmitted to the case 200b and/or the blade 250b (described further herein) to activate the integrated displays 220b, 240b. In this embodiment, the display screen of the mobile device is fully obstructed and can be fully deactivated when determined to be in a "backward" state.

Integrated displays 220b, 240b may comprise dynamic and/or passive displays. Dynamic displays may be touch-sensitive and able to be directly controlled by a user, while passive displays may display content without requiring or responding to user touch. Integrated displays 220b, 240b can have full or limited display functionality with respect to the display screen of the mobile device. For example, integrated display 240b may only be functional to display alerts regarding time, text messages, e-mails, and/or phone calls, and may not be functional to view web pages, while integrated display 220b may be used to execute all of the functions that can be executed on the display screen of the mobile device, or vice versa. In another example, both integrated displays 220b and 240b may be dynamic and fully functional.

In this embodiment, integrated display 240b may provide in or on the protective outer shell 210b of the reversible case 200b. On the other hand, integrated display 220b may be provided in or on the blade 250b. A "blade" as used herein refers to a thin stackable component comprising a microcontroller, one or more blade coupling force elements matched to one or more coupling force elements of a mobile device (e.g., magnets of a contact array 230b), and a plurality of blade terminals matched to a plurality of blade terminals of a mobile device (e.g., terminals of a contact array 230b), as described further in U.S. Pat. No. 8,798,675 B2, previously incorporated by reference in its entirety. The terminals may support high speed data, power, control, and addressing, for example.

Although described herein as integrated display 240b being provided in or in the protective outer shell 210b while integrated display 220b may be in or on the blade 250b, it is contemplated that these positions may be interchangeable. Further, it is contemplated that both displays may be provided in or on the protective outer shell 210b and/or both displays may be provided in or on the blade 250b. Further, although described with respect to two displays (i.e., integrated display 240b and integrated display 220b), it is contemplated that any number of displays may be provided.

Again, in one embodiment, the reversible case 200b may further include connectors 231a, 231b, and 231c. Connectors 231a-c may be mechanical male or female connectors, such as snaps, configured to mate to a corresponding male or female connector in corresponding locations on another device. Connectors 231a-c may further or alternatively include magnets to ensure a sturdy connection to another device. Although shown as circular in shape and positioned in a triangular configuration, it is contemplated that connectors 231a-c may be of any size, shape, or be placed in any configuration on the reversible case 200a.

In one embodiment, reversible case 200b can further integrate vibration capability. In this embodiment, certain alerts may be made via vibration of case 200a, such as phone calls, text messages and alarms. This may be alternative to vibration of the mobile device itself, further conserving battery life of the mobile device. In some embodiments, however, vibration of case 200a may be additional to vibration of the mobile device to provide more intense haptic feedback.

Figure 2C:
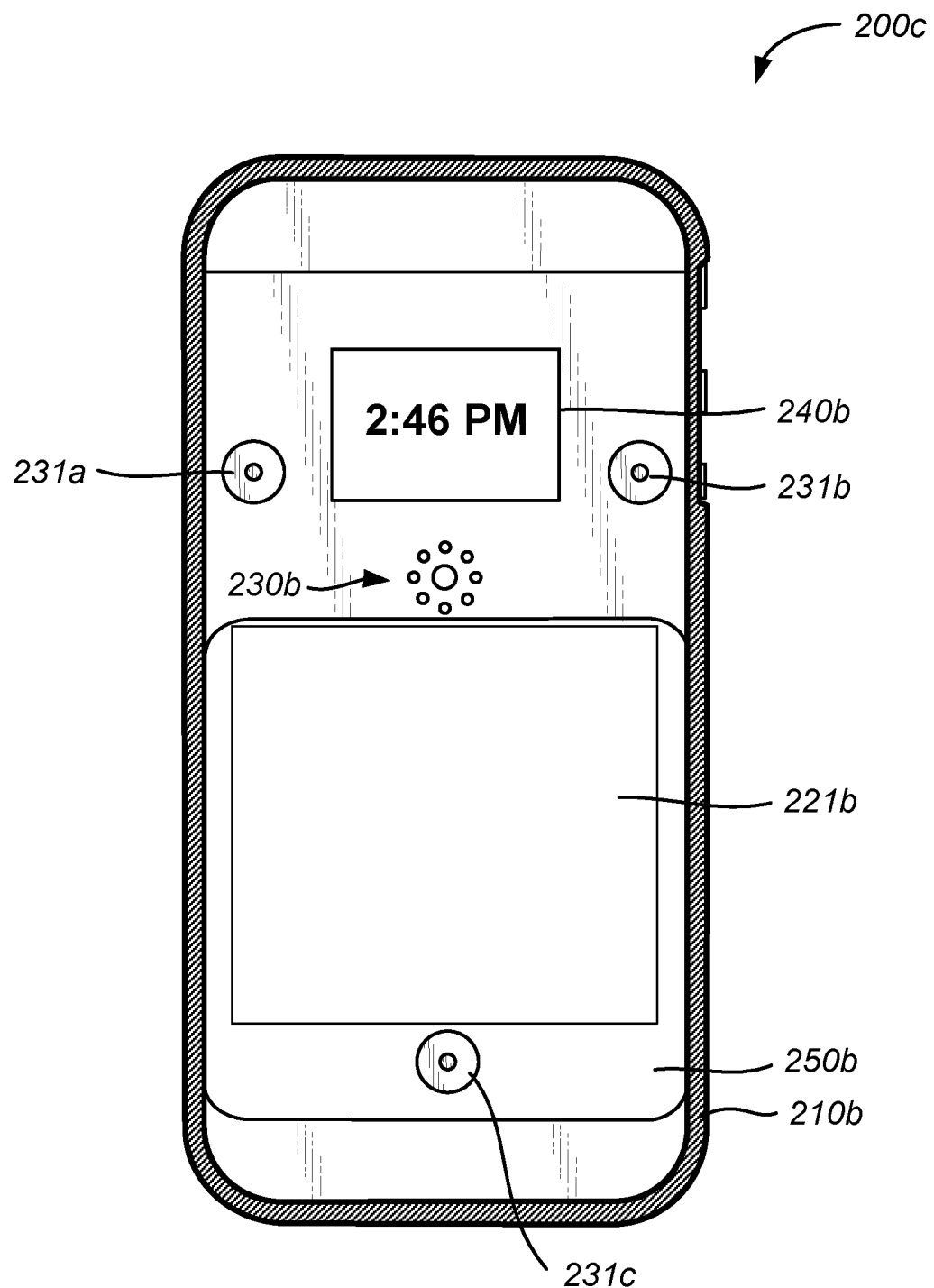
FIG. 2C is a bottom view of a reversible case having an integrated display and a sensor, housing a mobile device in a "backward" orientation, according to some embodiments.

FIG. 2C is a illustrates a reversible case 200c according to some embodiments. Reversible case 200c has an integrated display 240b and a sensor 221b (instead of display 220b), but is otherwise similar to reversible case 200b of FIG. 2B. Sensor 221b can be any type of sensor, such as a temperature sensor, pressure sensor, air quality sensor, gyroscope, or any other type of sensor, or combinations thereof. Sensor 221b can remain active regardless of whether the mobile device is forward or backward within the reversible case 200c in one embodiment. In another embodiment, sensor 221b can only be active when the mobile device is in one of the forward or backward orientations. Sensor 221b may be integrated into the reversible case 200c or may be provided in or on a blade, as described further herein.

Figure 3:
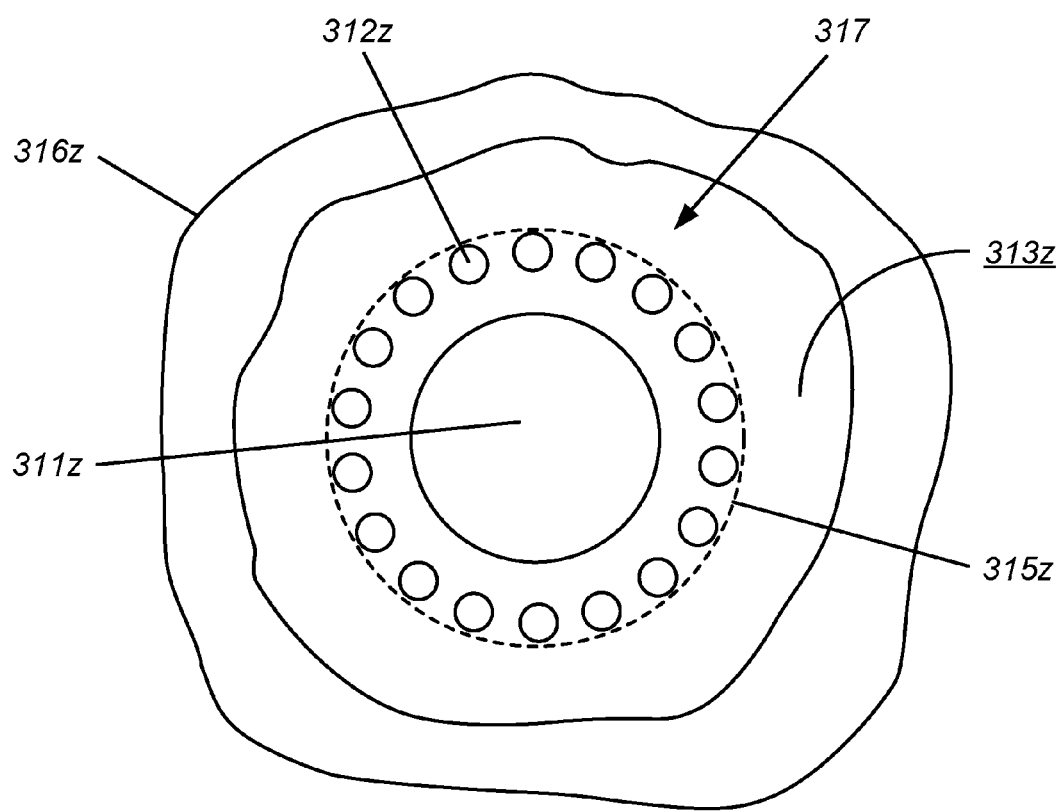
FIG. 3 is a plan view of a contact array employing a magnet and terminals, according to some embodiments.

FIG. 3 is a plan view of a contact array 317 employing a single magnet 311z and 18 terminals 312z according to an embodiment. Magnet 311z is configured so as to provide a coupling force between devices equipped with like contact arrays (e.g., mobile devices, cases, blades, etc.). Contact array 317 may be configured to mate with corresponding contact arrays, i.e., contact arrays having similar components and configurations. Any type of magnet may be used as magnet 311z, including an electromagnet. Terminals 312z may support high speed data, power, control, and addressing, for example. Although 18 terminals 312z are illustrated in FIG. 3, embodiments of the invention are not limited to this particular number and other numbers of terminals may be used. Data streams may flow between any and all combinations of devices. Multiple streams of data may flow simultaneously through a contact array or a smart interface element.

Magnet 311z and terminals 312z are disposed in coupling face 313z and coupling area 315z is shown. Contact array 317 has a circular format in this embodiment, and magnet 311z provides the coupling force. Coupling face 313z is contained within the body 316z of a device, such as a mobile device, a case, or a blade, as described herein. As illustrated, the dimensions of the coupling face and the body are independent of each other with the coupling face being a portion of a larger attachment surface associated with the body.

Figure 4:
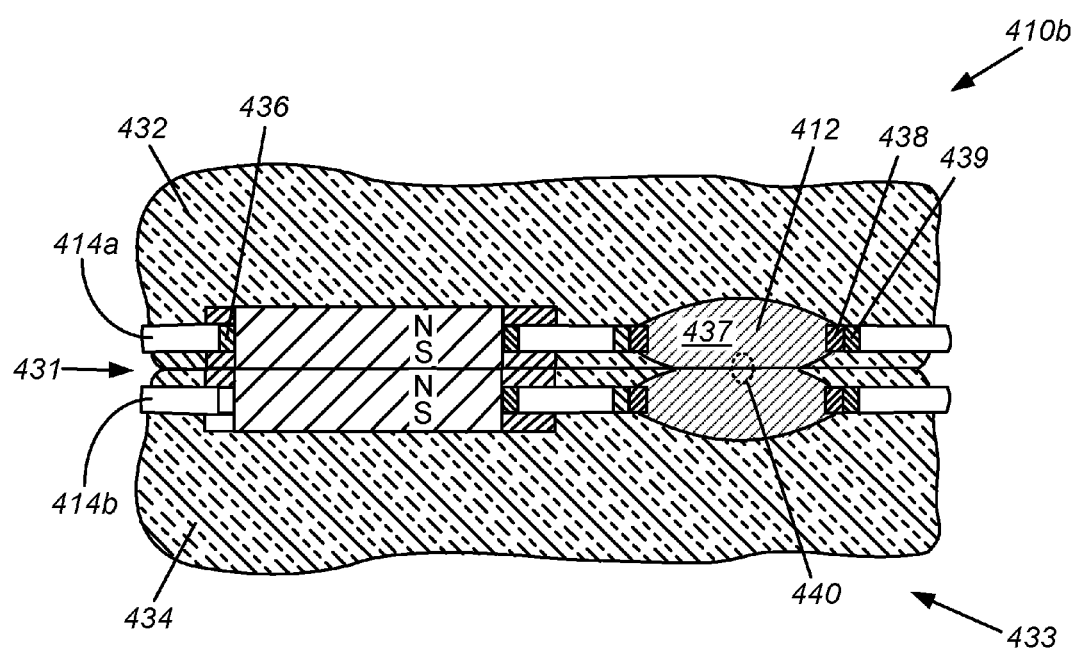
FIG. 4 is an expanded cross-section view of an interface between a contact array and an opposing coupled contact array, according to some embodiments.

FIG. 4 is an expanded cross-section view of an interface between a contact array and an opposing coupled contact array. Interface 431 is shown between a portion of a first contact array such as 410b associated with host device 432 and a corresponding portion of a like contact array 433 associated with an opposing host device 434. Host device 432 may represent a mobile device, for example, and host device 434 may represent a reversible case, for example. However, host devices 432 and 434 may be any of the mobile devices, blades, and/or cases described herein. The poling of the magnets provides for an attractive coupling force while using identical contact arrays. Contact arrays 410b and 433 are configured to support a "snap-on", "snap-off" characteristic for coupling and uncoupling, respectively. Each coupling event may be conveniently accomplished by a user, employing his or her fingers only, with no tools and no cables or cable connectors required.

Each host device comprises a substrate such as 414a and 414b, in some embodiments. Magnet bodies are typically conductive, and magnets typically have an electroplated outer surface that is also electrically conductive, and may be used as electrical terminals using a press fit, for example, in a feedthrough such as via 436 in substrate 414a. A terminal 412 may comprise a body 437 of conductive rubber molded within a conductive ring 438 and the supportive conductive ring 438 may be soldered or press fit in a feedthrough such as via 439 in substrate 414a. As shown at location 440, each terminal may compress at the interface with an opposing terminal so as to be contained in the available space between contact arrays, assuming direct contact of the magnets.

Other types of compliant terminals may also be used, each type typically comprising a compliant conductive member on at least one side of the interface. The terminals on the other side of the interface may comprise hard elements such as metal disks, for example. The body of the compliant terminal may comprise conductive rubber for example, as shown in FIG. 4, or it may comprise a dome-shaped deflectable conductive membrane (not shown) as a further example. POGO pins comprising spring loaded contacts may also be used as terminals. It is contemplated that other variations, alternatives and modifications can be used.

In certain contexts it may be beneficial that devices such as host devices 432 and 434 illustrated in FIG. 4 are capable of communicating through the terminals and/or the magnets without the need, in some embodiments, for the use of radio frequency (RF) signals passing between the system components. The presence of radio signals may present a vulnerability to detection by RF sniffer circuits, for example, and this may pose a security threat to the user. Thus, embodiments may utilize wired communications between devices, providing solutions that are not readily available using wireless communications technology and protocols.

Although shown and described in particular positions and of particular sizes and shapes, it is contemplated that the various elements described herein can be in any position, can be any size, and can be any shape, while still maintaining the necessary configurations and connections for functioning as described herein. For example, with respect to FIG. 3, some or all of the terminals can be circular instead of square; the magnet can be rectangular instead of circular (or multiple magnets can be utilized); and the magnetic contacting array can be triangular instead of circular. These are merely examples of alternatives that may be implemented; however, many other alternatives are available as appreciated by one skilled in the art.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A reversible mobile device case comprising:
an outer shell configured to encompass at least a portion of a mobile device;
a coupling face disposed on the outer shell;
a contact array disposed on the coupling face comprising:
one or more coupling force elements configured to match to one or more blade coupling force elements, and
one or more terminals configured to match to one or more blade terminals; and
one or more display screens coupled to the coupling face.

2. The reversible mobile device case of claim 1, wherein the one or more coupling force elements comprise at least one of magnets and a region of electric charge.

3. The reversible mobile device case of claim 1, wherein the one or more terminals are configured to support at least one of data, power, control, and addressing.

4. The reversible mobile device case of claim 1, wherein at least one of the one or more display screens are dynamic.

5. The reversible mobile device case of claim 1, wherein the outer shell comprises a window configured to display a portion of a display screen of the mobile device.

6. The reversible mobile device case of claim 1, wherein at least one of the one or more display screens is integrated into the outer shell.

7. The reversible mobile device case of claim 1, further comprising: a blade coupled to the coupling face, wherein at least one of the one or more display screens is integrated into the blade.

8. The reversible mobile device case of claim 1, wherein the outer shell fully encompasses a display screen of the mobile device.

9. The reversible mobile device case of claim 1, further comprising:
one or more sensors configured to determine an orientation of the mobile device within the outer shell.

10. The reversible mobile device case of claim 1, wherein the mobile device includes sides, a front, and a back, and wherein the outer shell wraps around the sides and at least one of the front or the back of the mobile device.

11. A mobile device case comprising:
an outer shell configured to hold a mobile device, wherein the mobile device includes a display screen, and wherein a first portion of the display screen is covered by the outer shell;
a coupling face disposed on the outer shell;
a window formed in the outer shell and a portion of the coupling face, wherein the window is configured to expose a second portion of the display screen of the mobile device; and
a contact array disposed on the coupling face comprising:
one or more coupling force elements configured to match to one or more coupling force elements, and
one or more terminals configured to match to one or more blade terminals.

12. The mobile device case of claim 11, wherein the window includes a layer of clear material.

13. The mobile device case of claim 11, wherein the outer shell includes an integrated display.

14. The mobile device case of claim 13, wherein the integrated display is a dynamic display.

15. The mobile device case of claim 13, wherein the integrated display is a passive display.

16. The mobile device case of claim 11, further comprising:
a blade coupled to the coupling face, wherein the blade further comprises:
a microcontroller, and
a blade contact array, wherein the contact array includes:
the one or more coupling force elements configured to match to the one or more coupling force elements disposed on the coupling face, and
the one or more blade terminals configured to match to the one or more terminals disposed on the coupling face.

17. The mobile device case of claim 16, wherein the blade contact array is configured to communicate with a corresponding contact array on at least one of the outer shell or the mobile device.

18. The mobile device case of claim 11, wherein the first portion of the display screen is an inactivated portion of the display screen.

19. The mobile device case of claim 18, wherein the second portion of the display screen is an activated portion of the display screen.

20. The mobile device case of claim 11, wherein the outer shell and the window fully encompass the mobile device.

* * * * *